July 12, 1932. J. S. KEUPER 1,867,458
FISH BAIT
Filed Oct. 30, 1931
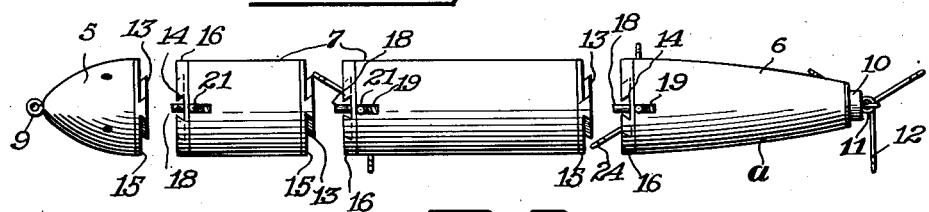
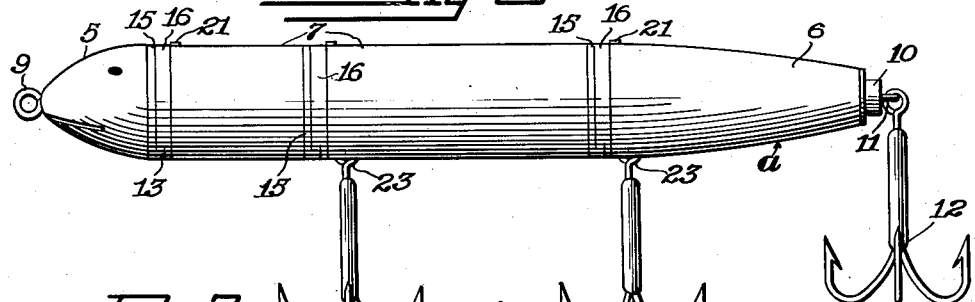
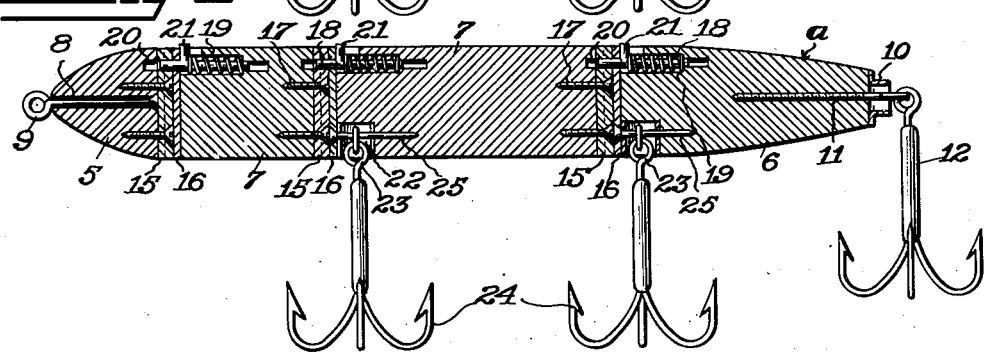
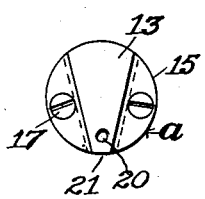
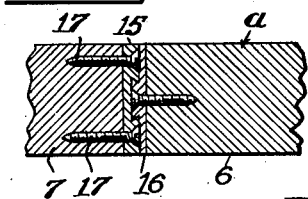
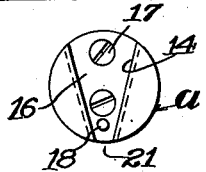
Joe S. Keuper
INVENTOR
BY Victor J. Evans & Co.
ATTORNEY
WITNESS
H. J. Meader Patented July 12, 1932

1,867,458

UNITED STATES PATENT OFFICE

JOE S. KEUPER, OF EAST LIVERPOOL, OHIO

FISH BAIT

Application filed October 30, 1931. Serial No. 572,126.

The invention relates to a bait and more especially to a changeable artificial fish bait.

The primary object of the invention is the provision of a bait of this character wherein the buoyant body thereof is constituted by separable sections, the separation of which enables the altering or changing of the head of the bait and also the varying of the length thereof and by reason of the changing of the formation of the head the activity of the bait when in a body of water causes a variation in its motion within such water to meet the needs in the use thereof for catching different species of fish.

Another object of the invention is the provision of a bait of this character wherein the sections of its body when joined together will be firm and secure and the body altered in its formation at the will of the user of the bait, the bait in its entirety being of novel form and when not in use can be readily stored in the least possible space as the length of the body can be reduced by separation of its sections.

A further object of the invention is the provision of a bait of this character which is extremely simple in construction, thoroughly reliable and efficient in its purpose, strong, durable, neat and attractive in appearance, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:—

Figure 1 is a top plan view of a bait constructed in accordance with the invention showing the sections of its body separated or detached one from the other.

Figure 2 is a side elevation of the bait with the sections of its body joined for use.

Figure 3 is a vertical longitudinal sectional view through the bait.

Figure 4 is a fragmentary horizontal transverse sectional view through a joint between adjacent sections of the body.

Figure 5 is an end elevation of one section separated from the other of the body of the bait.

Figure 6 is a view similar to Figure 5 showing the companion end thereto of another section of the body.

Similar reference characters indicate corresponding parts throughout the several views in the drawing.

Referring to the drawing, the artificial bait is designated generally at A and includes a head section 5, tail section 6 and intermediate sections 7, these being separably connected and interchangeable in a manner presently described.

The head section 5 is preferably outwardly tapered and has surface ornamentation indicative of the head of a fish and in the use of the artificial bait by reason of the separable character of the head section other formations of heads and representations may be substituted at the option of the user of the bait and in the use of a selected head the motion of the bait in a body of water is regulated thereby. Swiveled centrally in this head section is the shank 8 of an eye member 9 for the attachment thereto of a fishing rod.

The tail section 6 is preferably outwardly tapered and has mounted at its smaller end a terminal nipple 10 while anchored in this smaller end and protruded centrally through the nipple is an eye member 11 having loosely attached thereto a cluster fish hook 12 which is adapted to loosely depend from the bait when in use.

The separable intermediate sections 7 are detachably joined with each other and also joined with the head and tail sections 5 and 6 and such juncture is had between the meeting ends of adjacent sections through the medium of tapered dovetail-shaped tongues and grooves 13 and 14 respectively, each tongue being projected from a circular base or disk 15 while the groove 14 is formed in a circular base or disk 16, these matching the adjacent ends of the sections of the body of the bait and are secured thereto through the medium of fasteners 17. By insertion of the tongue 13 in the groove 14 the meeting ends of adjacent sections will be detachably and firmly joined with each other. The sections when thus joined are locked together through the medium of spring pressed latching bolts 18 fitted in suitable sockets 19 in the sections carrying the same and these bolts each being designed to engage a keeper hole 20 formed in the plate or disk 15 having the tongue or groove 13.

Each bolt 18 carries a hand nib 21 which is exposed from the section fitted with the bolt so that this nib can be manually manipulated for retracting the bolt when it is desired to detach one section from the other of the bait.

Certain of the sections of the body of the bait have formed in their undersides recesses 22 for accommodating the attaching ends 23 of cluster fish hooks 24 for their loose connection with anchoring fasteners 25 which bridge the recesses 22 and are secured in the sections having the same.

It will be apparent that by reason of the sectional formation of the body A of the bait by removal of one or more of said sections and the joining of the remaining sections with each other the length of the body of said bait will be altered and also by selectively changing the formation or character of the head section 5 the motion of the bait in the water will be changed accordingly to the requirements of the user of the bait for fishing purposes. In other words by removing the intermediate section 7 and joining the head 5 with the tail section 6 a short artificial bait will be had. Then by connecting the head section 5 and also the tail section 6 a further alteration of the bait will be had and by connecting the head section 5 and also the tail section 6 with one or more of the intermediate sections 7 a further change in the bait body will be effected. Furthermore by selectively changing the character of the head section 5 of the bait the motion of the latter within a body of water will be altered so that the bait in its character is susceptible of variable changes.

The bait A, that is, the sections thereof, may be made from metal and hollow. Also they may be made from wood or other buoyant material.

It is preferable to have the sections of the bait A round in cross section and the length of each may be varied which will alter the extent of the body of the said bait and also such extent changed when all of the sections are grouped and united with each other or by the omission of the use of the intermediate sections or the use of one or more of these.

It is to be understood that the sections of the bait A can be made of any suitable material to assure buoyancy thereto and the conformation in cross section of these sections vaired to suit the fancy of the maker or the user of the bait and at the same time by the use of selected material durability and longevity is assured.

The external surface of the body A of the bait as a whole may be ornamented to lend attraction thereto in the use thereof for fishing.

What is claimed is:—

1. A bait of the kind described comprising a body formed of a plurality of sections, means for detachably connecting the sections end to end to permit omission of one or more or interchanging of a section, and means for detachably locking the sections when joined with each other.

2. A bait of the kind described comprising a body formed of a plurality of sections, means for detachably connecting the sections end to end to permit omission of one or more or interchanging of a section, means for detachably locking the sections when joined with each other, and cluster hooks carried by certain of the sections.

3. A bait of the kind described comprising a body formed of a plurality of sections, means for detachably connecting the sections end to end to permit omission of one or more or interchanging of a section, means for detachably locking the sections when joined with each other, and cluster hooks carried by certain of the sections, the said connections between the sections being of tapered dovetailed tongue and groove formation.

In testimony whereof I affix my signature.

JOE S. KEUPER.